United States Patent
Izumo et al.

(10) Patent No.: US 10,054,480 B2
(45) Date of Patent: Aug. 21, 2018

(54) MASS SENSOR

(71) Applicant: A&D COMPANY, LIMITED, Tokyo (JP)

(72) Inventors: Naoto Izumo, Saitama (JP); Satoshi Suzaki, Saitama (JP)

(73) Assignee: A&D COMPANY, LIMITED, Tokyo ( * ) Notice: Subject to any disclaimer, the term of this patent is extended or adjusted under 35 U.S.C. 154(b) by 148 days.

(21) Appl. No.: 15/318,600

(22) PCT Filed: Jun. 26, 2014

(86) PCT No.: PCT/JP2014/066932
§ 371 (c)(1),
(2) Date: Dec. 13, 2016

(87) PCT Pub. No.: WO2015/198433
PCT Pub. Date: Dec. 30, 2015

(65) Prior Publication Data
US 2017/0138783 A1   May 18, 2017

(51) Int. Cl.
*G01G 21/24* (2006.01)
*G01G 23/00* (2006.01)

(52) U.S. Cl.
CPC .......... *G01G 23/005* (2013.01); *G01G 21/24* (2013.01)

(58) Field of Classification Search
CPC ............................. G01G 23/005; G01G 21/24
USPC ........................................................ 177/225
See application file for complete search history.

(56) References Cited

U.S. PATENT DOCUMENTS 3,967,691 A * 7/1976 Wirth ................. G01G 1/18
177/230

FOREIGN PATENT DOCUMENTS

| JP | 06-072034 U | | 10/1994 |
| JP | 2000121421 | * | 4/2000 |
| JP | 2002365125 | * | 12/2002 |
| JP | 2003057127 A | | 2/2003 |
| JP | 2007315774 A | | 12/2007 |
| JP | 2008003031 | * | 1/2008 |
| WO | 2005031286 A | | 4/2005 |

OTHER PUBLICATIONS

International Search Report dated Jul. 29, 2014 in the corresponding application PCT/JP2014/066932.

* cited by examiner

*Primary Examiner* — J M Saint Surin
(74) *Attorney, Agent, or Firm* — Roberts Mlotkowski Safran Cole & Calderon, P.C.

(57) ABSTRACT

Provided is a mass sensor including a four-corner-adjusting-mechanism capable of reducing the sensitivity of four-corner adjustment without reducing the rigidity of a Roberval mechanism. A mass sensor (1) includes a Roberval mechanism (2) in which a floating frame (21) and a fixing frame (22) are connected by upper and lower sub-frames (23, 24) having thin portions (23b) formed thereon, and a four-corner-adjusting-mechanism (4) to perform parallelism adjustment. The four-corner-adjusting-mechanism (4) includes an adjusting screw (41), and an upper elastic member (42u) and a lower elastic member (42d) disposed in series in the vertical direction so as to sandwich the sub-frame (23) to be subjected to parallelism adjustment.

3 Claims, 9 Drawing Sheets

MASS SENSOR

TECHNICAL FIELD

The present invention relates to a four-corner-adjusting-mechanism of a mass sensor including a Roberval mechanism.

BACKGROUND ART

A Roberval mechanism is widely used as a mechanism that transmits a load of a weighing object to a sensor main body in an electromagnetic balance, a strain gauge electronic balance, a capacitance balance using a capacitance change, and so on.

A Roberval mechanism has a structure in which a floating frame that receives a load of a weighing object and a fixing frame disposed opposite to the floating frame and fixed to a case or the like are connected by upper and lower sub-frames having thin portions serving as hinges near both end portions and disposed one above the other in parallel to each other, and in principle, even when eccentric loading (four-corner error) occurs on a weighing pan supported by the floating frame, a horizontal component of a moment load that is caused by the eccentric loading and applied to a sensor part is transmitted to the upper and lower sub-frames and canceled, and only a vertical component is transmitted to the sensor main body.

Thus, when a parallelism between the upper and lower sub-frames is lost, an error of the horizontal component is directly reflected in a measured value, so that, in a high-accuracy mass sensor including a Roberval mechanism, parallelism adjustment to match the heights of the upper and lower sub-frames is performed.

This height adjustment is commonly performed by cutting adjustment points (thin portions). However, this cutting method is not reversible, and an adjustment error caused by frictional heat is a concern, so that there are mass sensors provided with a reversible four-corner-adjusting-mechanism by use of a screw.

For example, the mass sensor described in Patent Literature 1 has a four-corner-adjusting-mechanism in which an upper sub-frame is fixed on cantilevered arm portions provided to extend from one end portion of a fixing frame toward an inner side of the sensor, and adjusting screws are inserted through substantially central portions of the arm portions and screwed to the fixing frame. Between the arm portions and the fixing frame, coiled springs to bias restoration of the arm portions when the adjusting screws are loosened are provided. With this four-corner-adjusting-mechanism, by rotating the adjusting screws, the upper sub-frame rises and lowers, and a parallelism between upper and lower sub-frames can be adjusted.

CITATION LIST

Patent Literature

Patent Literature 1: Japanese Unexamined Patent Application Publication No. 2007-315774

SUMMARY OF THE INVENTION

Problem to be Solved by the Invention

Reversible four-corner adjustment is enabled by the four-corner-adjusting-mechanism using the adjusting screws described above. However, in recent years, higher-performance mass sensors have been developed, and in particular, higher accuracy in adjustment of a parallelism between upper and lower sub-frames has been demanded for a balance with high resolution.

Here, in order to reduce the sensitivity of four-corner adjustment, increasing the Roberval mechanism in size or reducing the rigidity of the four-corner-adjusting part is simple thought. Based on the thought, reduction in thickness of portions to be subjected to four-corner adjustment or formation of cut portions is conceived. However, on the other hand, from a viewpoint of maintaining product performance of a balance, the rigidity of the mass sensor is preferably made as high as possible. Unfortunately, reducing in sensitivity of four-corner adjustment and keeping high rigidity of a Roberval mechanism are contradictory to each other, so that it is difficult to satisfy both of these requirements.

An object of the present invention is to provide a mass sensor including a four-corner-adjusting-mechanism capable of reducing the sensitivity of four-corner adjustment without reducing the rigidity of a Roberval mechanism.

Means for Solving the Problem

In order to solve the above-described problem, a mass sensor according to an aspect of the present invention includes: a Roberval mechanism including a floating frame that receives a load of a weighing object, a fixing frame disposed opposite to the floating frame, and upper and lower sub-frames disposed one above the other in parallel, each having thin portions around both ends thereof and each connecting the floating frame and the fixing frame; and a four-corner-adjusting-mechanism for adjusting a parallelism of the upper and lower sub-frames, wherein the four-corner-adjusting-mechanism includes: an adjusting screw to be vertically inserted in a fixing frame side end portion of at least one of the upper and lower sub-frames, and to be screwed to the fixing frame; and an upper elastic member and a lower elastic member that are disposed in series in the vertical direction around a threaded portion of the adjusting screw so as to sandwich the fixing frame side end portion.

According to this aspect, an adjusting screw and two elastic members are used as a four-corner-adjusting-mechanism, the adjusting screw is inserted through a sub-frame to be subjected to parallelism adjustment, and at the threaded portion of the adjusting screw, the two elastic members are disposed in series so as to sandwich the sub-frame in the vertical direction that is a height adjustment direction. Accordingly, when the adjusting screw is tightened, a displacement amount caused by the adjusting screw is divided into displacement amounts of the upper and lower elastic members, and as a result, the sub-frame positioned in between the upper elastic member and the lower elastic member is displaced by only an amount obtained by subtracting the displacement amount of the upper elastic member. That is, a displacement amount obtained by subtracting the displacement amount of the upper elastic member from the displacement amount of the adjusting screw functions as a height adjustment amount of the Roberval mechanism, and accordingly, the sensitivity of four-corner adjustment can be reduced without enlarging the structure of the four-corner-adjusting-mechanism.

According to this aspect, two elastic members are disposed above and below a sub-frame to be adjusted, so that the thickness and shape of the portion at which the four-corner-adjusting-mechanism is provided are not changed.

Accordingly, even when the four-corner-adjusting-mechanism is added, the rigidity of the Roberval mechanism is maintained.

In the above-described aspect, an elastic modulus of the upper elastic member is preferably smaller than that of the lower elastic member. Accordingly, the displacement of the adjusting screw of the four-corner-adjusting-mechanism is divided in inverse proportion to an elastic modulus ratio of the upper and lower elastic members, so that, by providing a difference between the elastic moduluses of the upper and lower elastic members and setting the elastic modulus of the lower elastic member to be larger than that of the upper elastic member, an offset of the displacement amount of the upper elastic member becomes large, the above-described aspect functions favorably, and the sensitivity of four-corner adjustment can be further reduced.

In the above-described aspect, preferably, the sub-frame that is equipped with the four-corner-adjusting-mechanism includes a joint portion joined to the fixing frame, and the joint portion is disposed between the thin portion of the sub-frame and the four-corner-adjusting-mechanism. Accordingly, a fulcrum is formed between a point of effort (four-corner-adjusting-mechanism) and an adjustment point (thin portion), so that a vertical component can be purely transmitted to the Roberval mechanism.

In the above-described aspect, preferably, both of the upper elastic member and the lower elastic member are flat springs or coiled springs. More preferably, the upper elastic member is a flat spring or a coiled spring, and the lower elastic member is a coiled spring. Accordingly, the overall height of the sensor configuration can be easily made low, and the sensor configuration can be downsized.

Effect of the Invention

With the mass sensor according to the present invention, the sensitivity of four-corner adjustment can be reduced without reducing the rigidity of the Roberval mechanism.

BEST MODES FOR CARRYING OUT THE INVENTION

Next, preferred embodiments of the present invention are described.

First Embodiment

FIG. 1 is a rear perspective view of a mass sensor according to a first embodiment of the present invention, FIG. 2 is a front view of the same mass sensor, FIG. 3 is a plan view of the same mass sensor, FIG. 4 is a right side view of the same mass sensor, and FIG. 5 is a longitudinal sectional view (taken along line V-V shown in FIG. 3) of the same mass sensor. In FIG. 2 to FIG. 5, description of a pan receiving part 210 is omitted.

A mass sensor 1 has a rectangular parallelepiped shape, and includes a Roberval mechanism 2 and a sensor main body 3. The Roberval mechanism 2 is equipped with a four-corner-adjusting-mechanism 4. As the sensor main body 3, an electromagnetic sensor is used by way of example (refer to FIG. 1, etc.).

In the Roberval mechanism 2, a columnar floating frame 21 that receives a load of a weighing object and a fixing frame 22 to be fixed to a case of a balance are disposed opposite to each other, and the floating frame 21 and the fixing frame 22 are connected by an upper sub-frame 23 and a lower sub-frame 24 that have tabular shapes and are disposed one above the other in parallel to each other. These floating frame 21, fixing frame 22, upper sub-frame 23, and lower sub-frame 24 are formed by cutting, with use of a milling machine, an integral metal block molded by aluminum die-casting, aluminum extruding, aluminum forging, or the like (refer to FIG. 2, etc.). Onto an upper surface of the floating frame 21, a pan receiving part 210 to support a weighing pan is screw-fixed.

In the fixing frame 22, a load transmitting part 29 projecting to a structure internal space of the Roberval mechanism 2 is formed. The load transmitting part 29 is connected to the floating frame 21 via a suspension band 30a, a primary beam body 31, and a fulcrum band 30b (refer to FIG. 5, etc.). A load applied to the floating frame 21 is transmitted to the sensor main body 3 via a secondary beam body 28 screwed to a side surface of the load transmitting part 29. The sensor main body 3 is held by the Roberval mechanism 2 via a frame body 26 (refer to FIG. 2, etc.). In the load transmitting part 29, a receiving hole 5' for attaching a shock absorber receiving part (not shown) is provided. In the load transmitting part 29, the primary beam body 31, and the upper sub-frame 23, positioning holes 29', 31', and 23' for setting the mass sensor 1 are provided, respectively (refer to FIG. 5, etc.).

Near both end portions of the upper and lower sub-frames 23 and 24, thin portions 23a, 23b, 24a, and 24b are formed across a sensor width direction (refer to FIG. 2 and FIG. 3, etc.).

A fixing frame side end portion 23E of the upper sub-frame 23 is bifurcated from a position at a sensor inner side of a portion where the thin portion 23b is formed, and extends horizontally at a predetermined distance from an upper surface of the fixing frame 22 (refer to FIG. 3 and FIG. 5, etc.). Hereinafter, one (lower one in FIG. 3) of extending portions of the fixing frame side end portion 23E is referred to as a first extending portion 2301, and the other one (upper one in FIG. 3) is referred to as a second extending portion 2302. On each of the first extending portion 2301 and the second extending portion 2302, at a sensor outer side position of the portion where the thin portion 23b is formed, a joint portion 230 that extends downward and is joined integrally to the upper surface of the fixing frame 22 is formed (refer to FIG. 5, etc.).

In the first extending portion 2301 and the second extending portion 2302, insertion holes for adjusting screws 41 described below are formed. In the fixing frame 22, female threaded portions in which the adjusting screws 41 are screwed are formed at positions facing the insertion holes.

The four-corner-adjusting mechanism 4 is provided at the first extending portion 2301 and the second extending portion 2302. Hereinafter, a configuration of the four-corner-adjusting mechanism is described by using the first extending portion 2301. The four-corner-adjusting-mechanism 4 is also provided at the second extending portion 2302 in the same manner. In the present embodiment, the four-corner-adjusting-mechanism 4 is provided at the extending portions 2301 and 2302 of the fixing frame side end portion 23E of the upper sub-frame 23, however, the four-corner-adjusting-mechanism 4 may be provided on the fixing frame side end portion of the lower sub-frame 24.

The four-corner-adjusting-mechanism 4 includes an adjusting screw 41, a flat spring 42u (upper elastic member) disposed at an upper side, and a coiled spring 42d (lower elastic member) disposed at a lower side.

As the adjusting screw 41, a commercialized product may be used as long as it has a screw head 410 and a threaded portion 411 on which male threads are formed. The adjusting screw is preferably made of the same material as that forming the Roberval mechanism 2 because this makes a difference in dimensional change with respect to thermal change small, and stabilizes the performance. The pitch of the threads is preferably small because this enables setting of the sensitivity of four-corner adjustment to be lower and makes adjustment easier.

The adjusting screw 41 is inserted through the insertion hole of the first extending portion 2301 and screwed into the female threaded portion formed in the fixing frame 22. At the threaded portion 411 of the adjusting screw 41, the coiled spring 42d is interposed at a position between the fixing frame 22 and the first extending portion 2301, and the flat spring 42u is interposed at a position between the first extending portion 2301 and the screw head 410.

The coiled spring 42d is interposed at the above-described position in a state compressed by a jig when the adjusting screw 41 is inserted.

The flat spring 42u is formed by bending one rectangular metal plate into an arc shape (arc portion is at approximately ¾) so that an upper plate portion and a lower plate portion form an acute angle with each other, and an upper plate portion functions as a cantilever spring. An end portion of the lower plate portion is bent downward to be fixed to the first extending portion 2301. At predetermined positions on the upper plate portion and the lower plate portion of the flat spring 42u, insertion holes for the adjusting screw 41 are formed. The flat spring 42u is interposed in a compressed state when the adjusting screw 41 is inserted, the lower plate portion is disposed along the first extending portion 2301 so that the bent portion to serve as a fulcrum is positioned at the sensor inner side and an open portion to serve as a point of effort is positioned at the sensor outer side, and an end portion of the lower plate portion is screw-fixed to a side surface of the first extending portion 2301. The above-described shape of the flat spring 42u is an example, and the flat spring may have any shape as long as a spring constant can be easily designed and the flat spring is formed without difficulty.

Both of the flat spring 42u and the coiled spring 42d are disposed in compressed states, so that a biasing force to press the four-corner-adjusting-mechanism 4 in a constant direction is always applied, so that backlash can be prevented from occurring during turning of the adjusting screw 41.

As described above, in the four-corner-adjusting-mechanism 4, the adjusting screws 41 are inserted through the upper sub-frame 23 to be subjected to parallelism adjustment, and at the threaded portions 411 of the adjusting screws 41, the flat springs 42u are disposed at the upper side and the coiled springs 42d are disposed at the lower side in series so that they sandwich the first extending portion 2301 and the second extending portion 2302 of the upper sub-frame 23 in the vertical direction that is a height adjustment direction.

Four-corner adjustment is performed by turning the adjusting screw 41. In response to vertical displacement of the adjusting screw 41 (screw displacement) caused by turning of the adjusting screw 41, the upper sub-frame 23 is displaced via the four-corner-adjusting-mechanism 4, and the adjustment point (thin portion 23b) is adjusted in height. Here, both of the coiled spring 42d and the flat spring 42u of the four-corner-adjusting-mechanism 4 are always subjected to an offset load, so that a stress change caused by the springs at the time of four-corner adjustment can be ignored. Then, the screw displacement of the adjusting screw 41 at the time of four-corner adjustment is divided in inverse proportion to a spring constant ratio of the upper and lower springs. That is, even when the adjusting screw 41 is tightened, the upper sub-frame 23 positioned between the flat spring 42u and the coiled spring 42d is influenced by only a displacement amount obtained by subtracting a displacement amount of the flat spring 42u from the screw displacement of the adjusting screw 41.

Here, a spring constant "Ku" of the flat spring 42u disposed at the upper side is designed to be smaller than a spring constant "Kd" of the coiled spring 42d disposed at the lower side. The displacement of the adjusting screw 41 of the four-corner-adjusting-mechanism 4 is divided in inverse proportion to the spring constant ratio of the flat spring 42u at the upper side and the coiled spring 42d at the lower side, so that an offset of the displacement amount of the upper flat spring 42u becomes large by setting the spring constant "Ku" of the spring at the upper side<the spring constant "Kd" of the spring at the lower side.

Thus, when the adjusting screw 41 is tightened, a displacement amount of the adjusting screw 41 is divided into displacement amounts of the flat spring 42u at the upper side and the coiled spring 42d at the lower side, and the displacement amount obtained by subtracting the displacement amount of the flat spring 42u at the upper side functions as a height adjustment amount of the Roberval mechanism 2. In particular, since the spring constant "Kd" of the coiled spring 42d at the lower side is set to be larger than the spring constant "Ku" of the flat spring 42u at the upper side, a large adjustment allowance can be provided above the sub-frame 23, and the sensitivity of the four-corner-adjusting-mechanism 4 can be more excellently reduced than in the case of reverse setting (a configuration in which the spring constant "Ku" of the flat spring 42 at the upper side is set to be larger than the spring constant "Kd" of the coiled spring 42d at the lower side).

According to the present embodiment, two elastic members 42u and 42d are disposed above and below the upper sub-frame 23 (the first extending portion 2301 and the second extending portion 2302) to be adjusted, and the first extending portion 2301 (second extending portion 2302) provided with the four-corner-adjusting-mechanism 4 is not reduced in thickness or cut. That is, the configuration of the four-corner-adjusting-mechanism 4 does not reduce the rigidity of the Roberval mechanism 2.

According to the present embodiment, a fulcrum is formed between the point of effort (four-corner-adjusting-mechanism 4) and the adjustment point (thin portion 23b) by providing the joint portion 230 between the four-corner-adjusting-mechanism 4 and the thin portion 23b. That is, the relationship of "an adjustment point, a fulcrum, and a point of effort" is established by providing the joint portion 230 at this position, and even when a torsional component occurs in the upper sub-frame 23 by turning the adjusting screw 41 of the four-corner-adjusting-mechanism 4, components other than a vertical component are made less transmittable due to interposition of the joint portion 230 (fulcrum), and only a pure vertical component is smoothly transmitted to the Roberval mechanism 2, so that the mass sensor 1 can be prevented from deteriorating in performance.

As a comparative example, a mass sensor configured so that the joint portion 230 was formed at a sensor outer position, and the four-corner-adjusting-mechanism 4 was positioned between the joint portion 230 and the thin portion 23b, was manufactured by way of trial production, and it was confirmed that in such a case where "an adjustment point, a point of effort, and a fulcrum" were arranged in this order, a four-corner error was not canceled.

As described above, in the present embodiment, the following effects could be confirmed in actuality. As a result, the sensitivity of four-corner adjustment could be reduced to ½ of the conventional sensitivity by using the four-corner-adjusting-mechanism 4 of the present embodiment. Difference between an example and a comparative example optimizes the sensitivity of four-corner adjustment at a position of ¼ on a pan of a balance with a maximum capacity of, for example, 10 (kg) when using a weight of maximum capacity×½, and enables adjustment up to ±0.05 g in terms of performance of a balance whereas a conventional adjustment up to ±0.01 g.

Example: In the above-described Roberval mechanism 2, the four-corner-adjusting-mechanism 4 was designed so that one pitch of the adjusting screw 41 (screw displacement) =0.5 (mm), the spring constant "Ku" of the flat spring $42u$=5 (kgf/mm), and the spring constant "Kd" of the coiled spring $42d$=10 (kgf/mm). In this example, when the adjusting screw 41 was lowered by one pitch, the Roberval displacement (displacement of the thin portion $23b$ serving as an adjustment point) was 0.05 (mm).

Comparative Example: In the conventional mass sensor (mass sensor configured as described in Patent Literature 1: Spring constant of a coiled spring disposed at a lower side for biasing=10 (kgf/mm)), when the same adjusting screw 41 of the example was used and lowered by one pitch, the Roberval displacement (displacement of the thin portion serving as an adjustment point) was 0.1 (mm).

Second Embodiment

FIG. 6 is a rear perspective view of a mass sensor according to a second embodiment of the present invention, FIG. 7 is a front view of the mass sensor according to the second embodiment of the present invention, FIG. 8 is a right side view of the mass sensor according to the second embodiment of the present invention, and FIG. 9 is a longitudinal sectional view (taken along line IX-IX shown in FIG. 8) of the mass sensor according to the second embodiment of the present invention.

In the second embodiment, a coiled spring $420u$ is used as the upper elastic member in the first embodiment. In this embodiment as well, a spring constant "K'u" of the coiled spring $420u$ disposed at the upper side is also preferably set to be smaller than the spring constant "Kd" of the coiled spring $42d$ disposed at the lower side. The same components as in the first embodiment are designated by the same reference signs and description thereof is omitted.

The coiled spring $420u$ disposed at the upper side is accommodated in a compressed state by a jig inside a coil holding part 421 fixed to the first extending portion 2301 and the second extending portion 2302 respectively. The coil holding part 421 sandwiches the coil from the upper and lower sides, and is configured so as not to directly transmit a torque of a screw to the coil but to stably transmit only vertical displacement to the coil. The same effect as the first embodiment is also obtained by the second embodiment.

Thus, the contradictory object to reduce the sensitivity of four-corner adjustment without reducing the rigidity of the Roberval mechanism 2 can be achieved by either of the four-corner-adjusting-mechanisms 4 described above. Each of the four-corner-adjusting-mechanisms 4 described above includes two elastic members disposed above and below a sub-frame to be adjusted, and does not need cutting adjustment that is conventionally commonly performed. This effect is preferable from the viewpoint of productivity of the mass sensor 1. That is, by using either of the four-corner-adjusting-mechanisms 4, the mass sensor 1 obtains improvement in performance and productivity as a weighing apparatus.

In addition, designing a difference in spring constant between the upper spring member and the lower spring member is easy by using spring members as the upper elastic member and the lower elastic member. Other aspects using, as the upper elastic member and/or the lower elastic member, a sol/gel sealed in a deformable airtight container or an elastic material such as a resin-based polymer material, are also possible, and an elastic body, preferably, an elastic body with reversible properties is included in an aspect of the present invention.

REFERENCE SIGNS LIST

Figure 1:
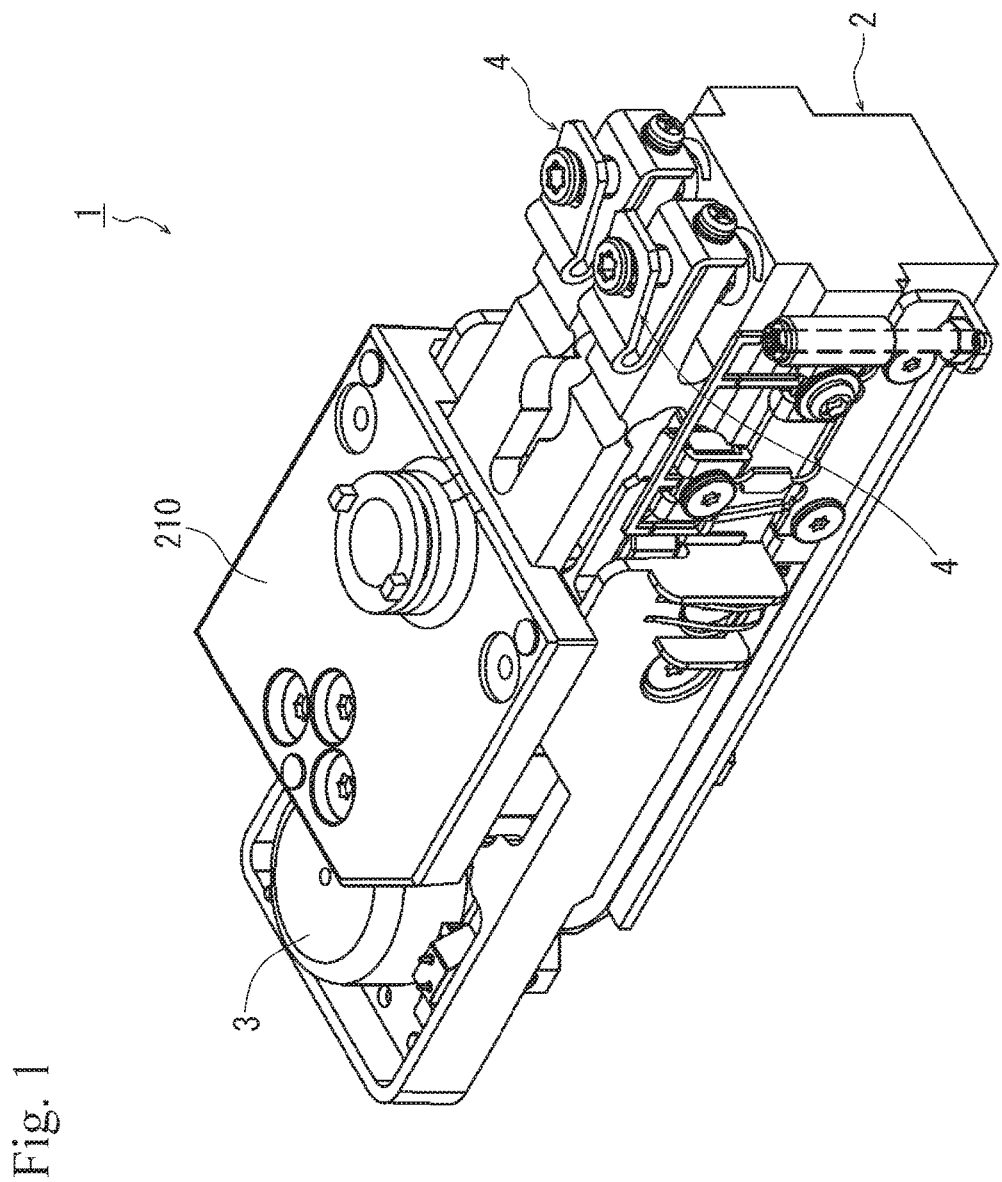
FIG. 1 is a rear perspective view of a mass sensor according to a first embodiment of the present invention.
Figure 2:
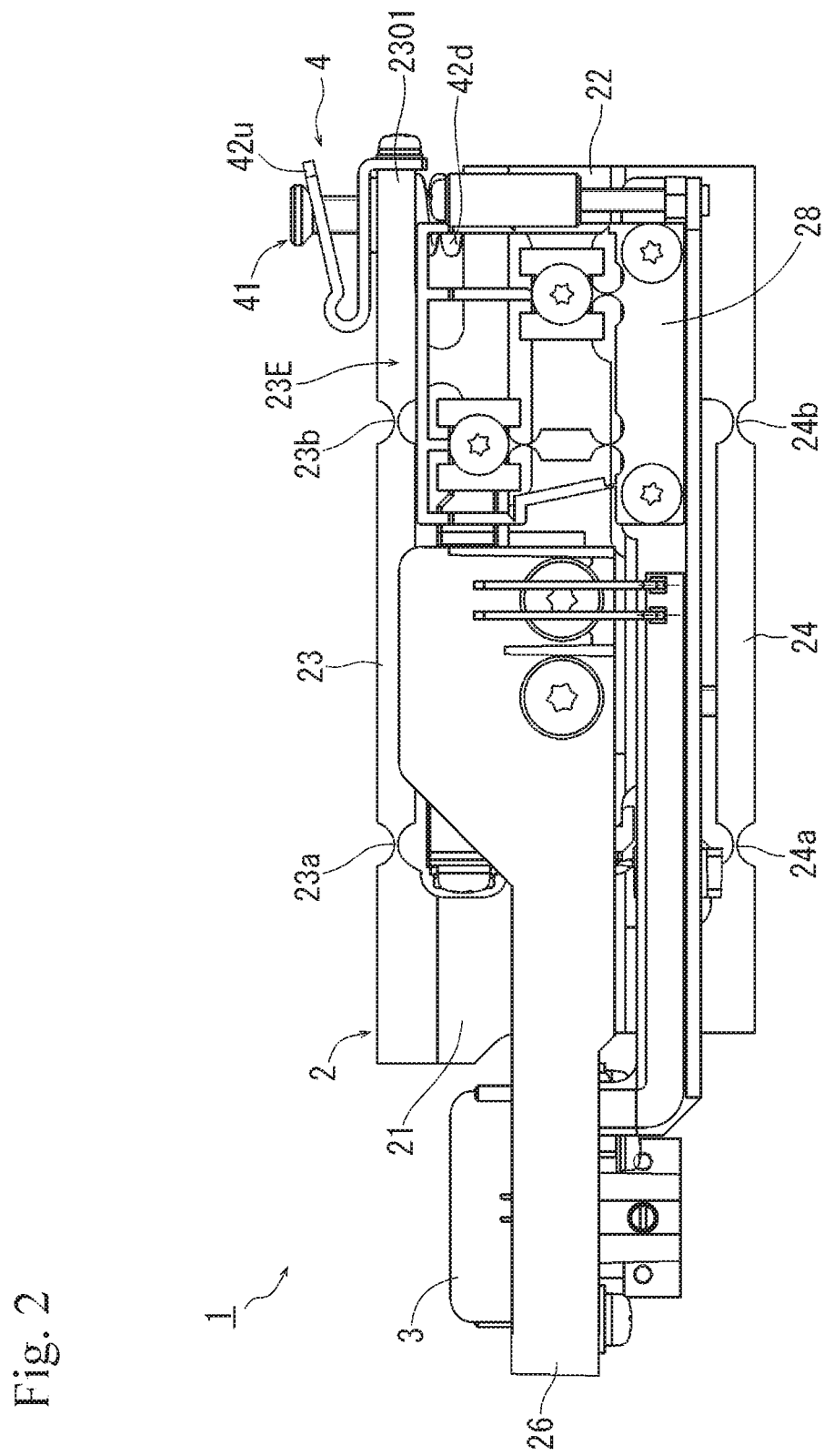
FIG. 2 is a front view of the mass sensor according to the first embodiment of the present invention.
Figure 3:
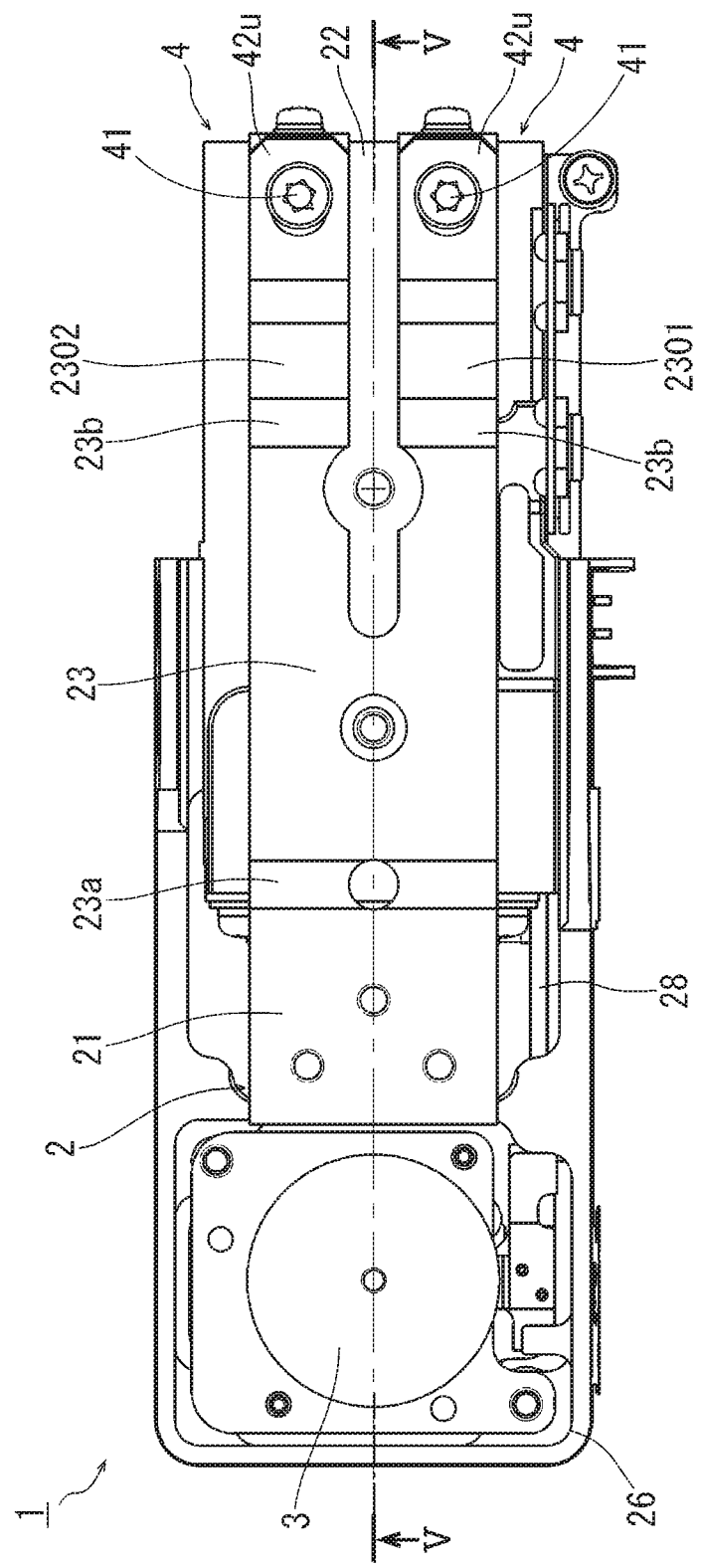
FIG. 3 is a plan view of the mass sensor according to the first embodiment of the present invention.
Figure 4:
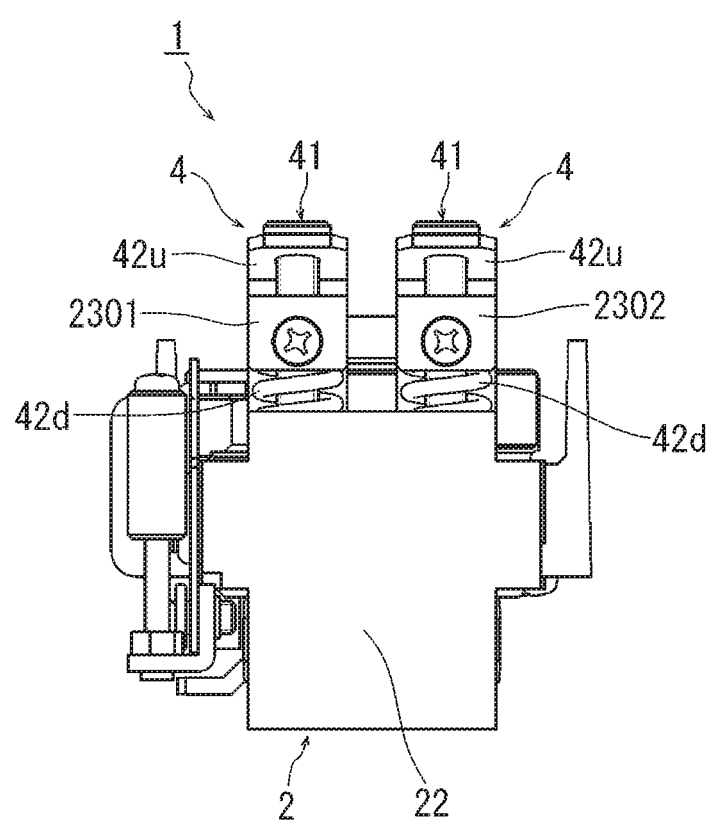
FIG. 4 is a right side view of the mass sensor according to the first embodiment of the present invention.
Figure 5:
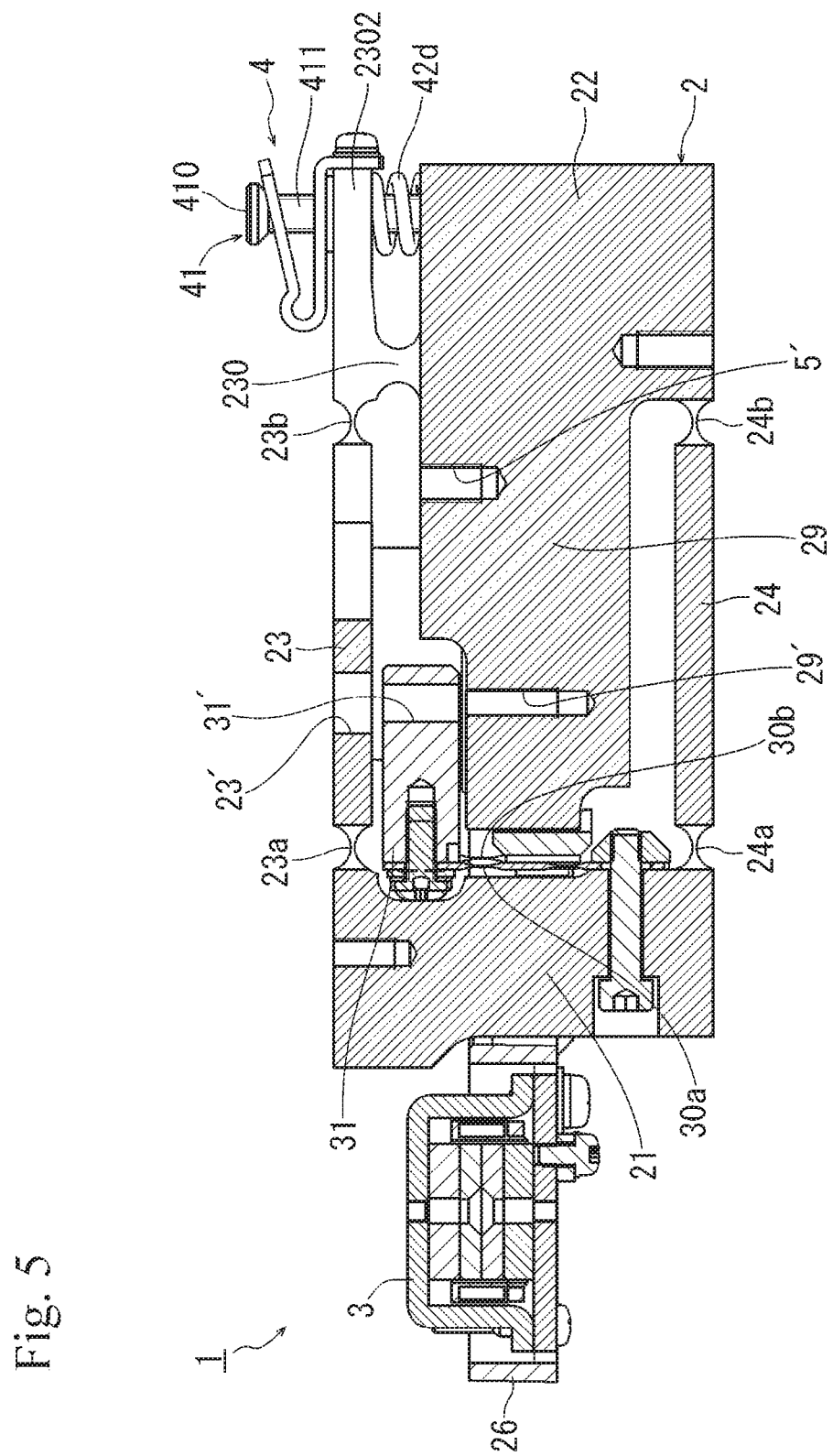
FIG. 5 is a longitudinal sectional view of the mass sensor according to the first embodiment of the present invention.
Figure 6:
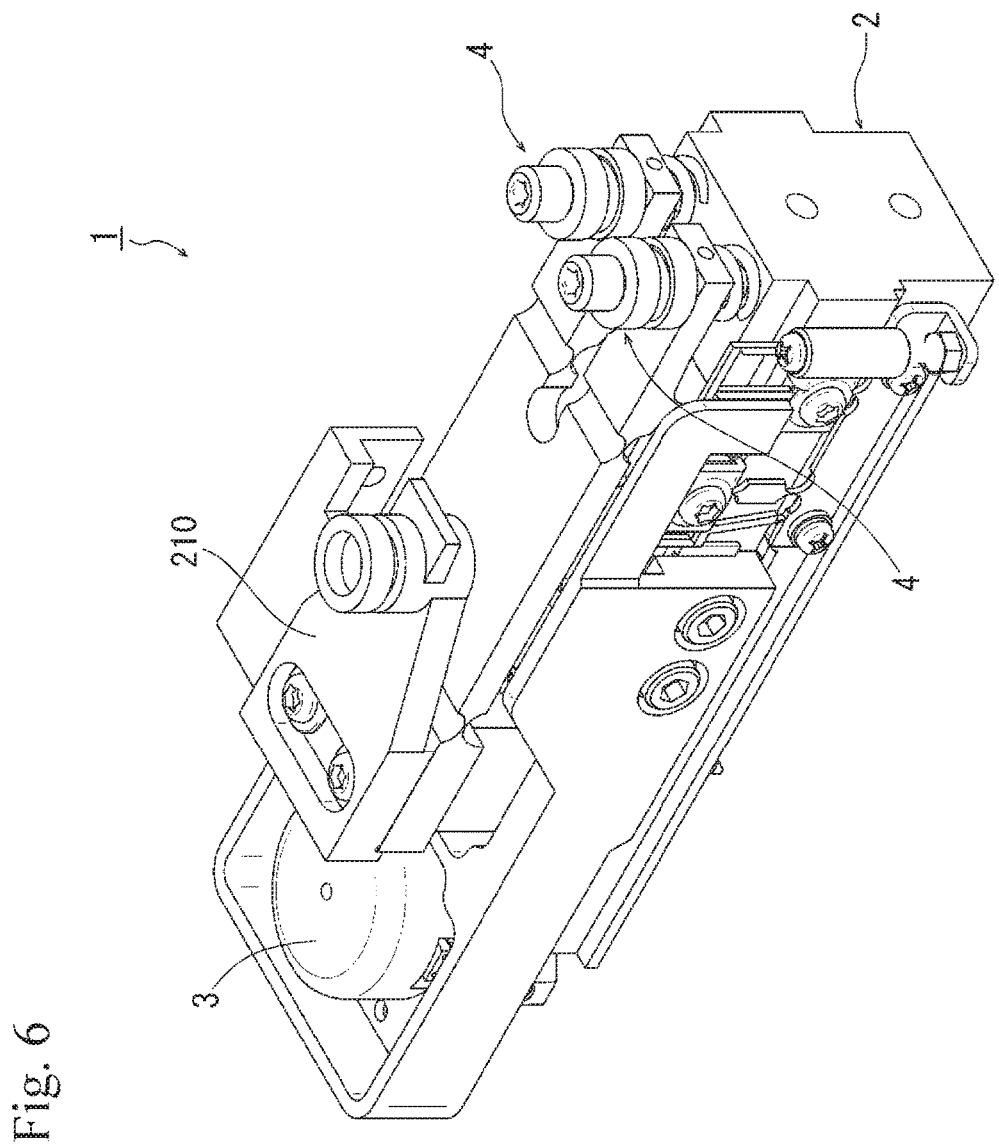
FIG. 6 is a rear perspective view of a mass sensor according to a second embodiment of the present invention.
Figure 7:
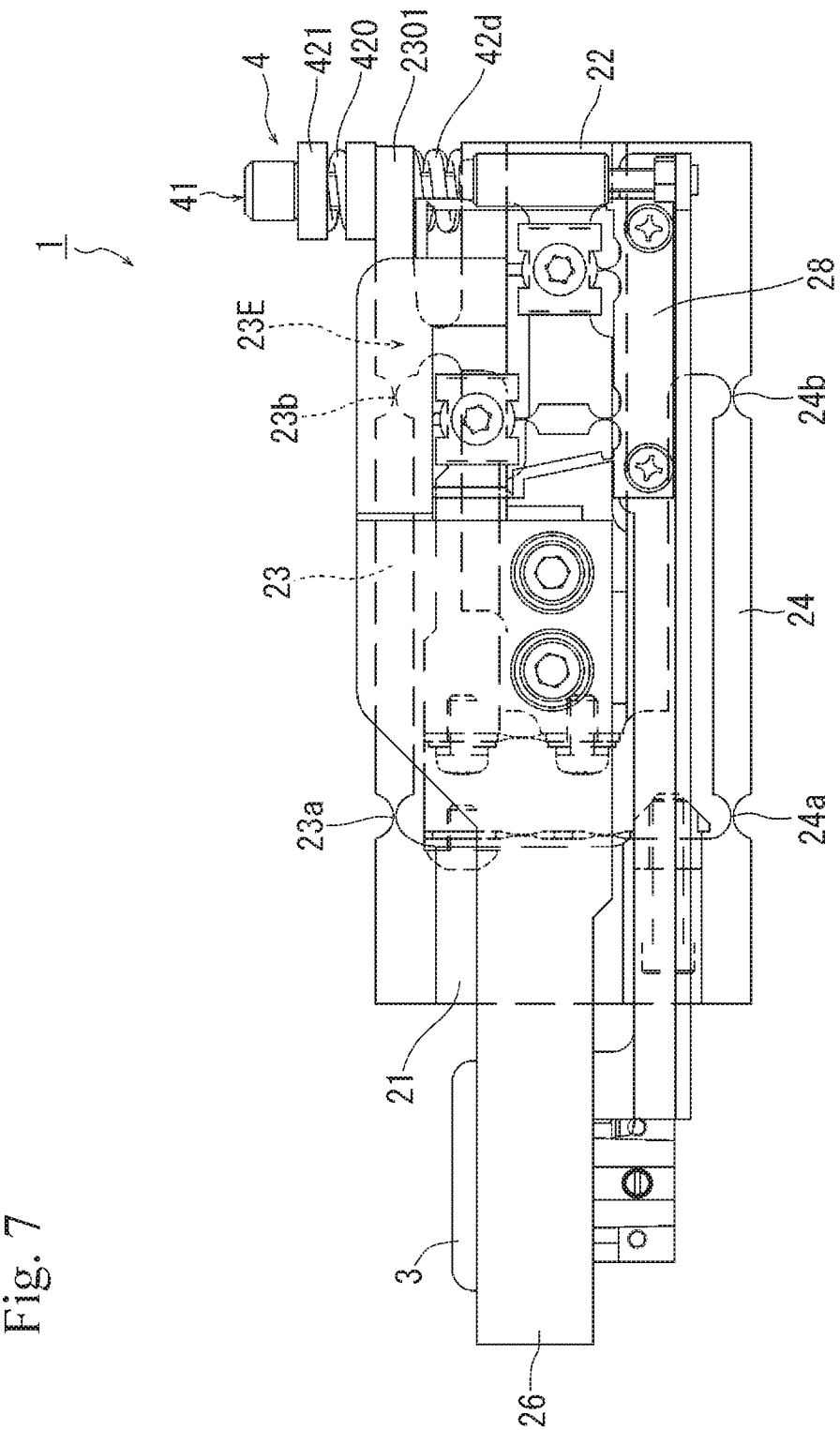
FIG. 7 is a front view of the mass sensor according to the second embodiment of the present invention.
Figure 8:
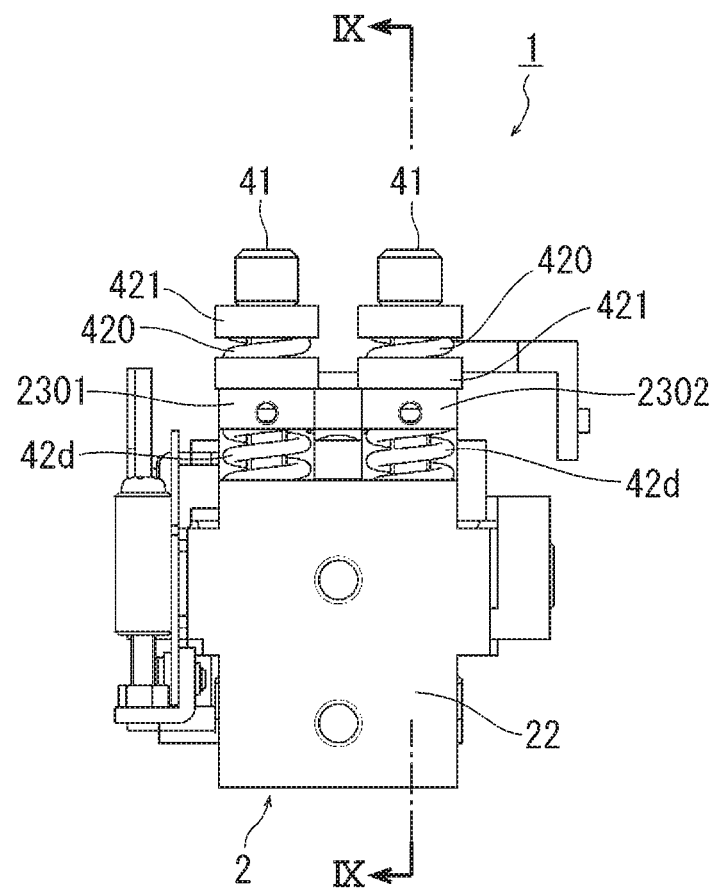
FIG. 8 is a right side view of the mass sensor according to the second embodiment of the present invention.
Figure 9:
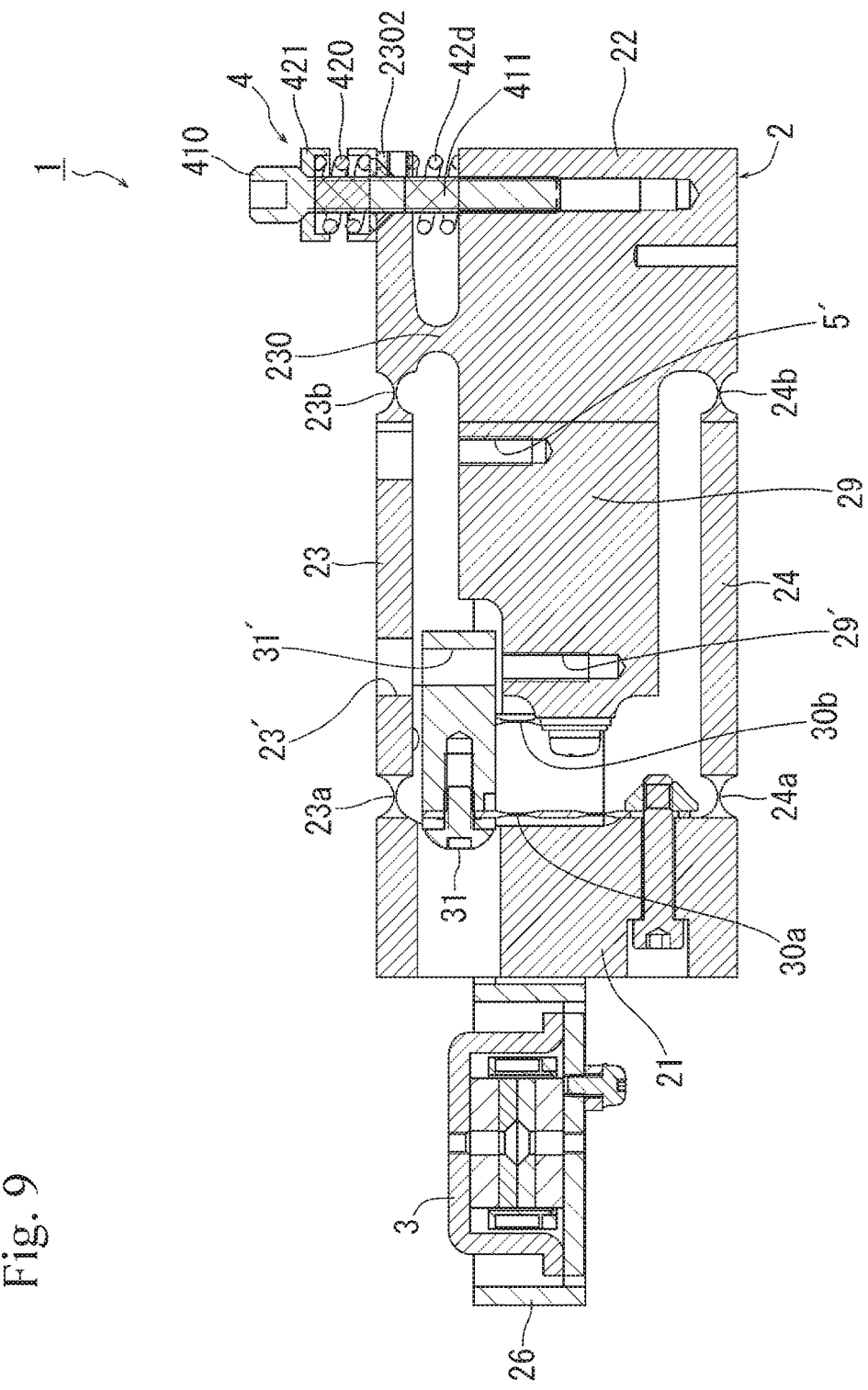
FIG. 9 is a longitudinal sectional view of the mass sensor according to the second embodiment of the present invention.

1 Mass sensor
2 Roberval mechanism
4 Four-corner-adjusting-mechanism
21 Floating frame
22 Fixing frame
23 Upper sub-frame
23a, 23b Thin portion
23E Fixing frame side end portion
230 Joint portion
2301 First extending portion
2302 Second extending portion
24 Lower sub-frame
24a, 24b Thin portion
41 Adjusting screw
411 Threaded portion
$42u$, 420 Upper elastic member (flat spring, coiled spring)
$42d$ Lower elastic member (coiled spring)

The invention claimed is:
1. A mass sensor comprising:
a Roberval mechanism including a floating frame that receives a load of a weighing object, a fixing frame disposed opposite to the floating frame, and upper and lower sub-frames disposed one above the other in parallel in a vertical direction, each having thin portions around both ends thereof and each connecting the floating frame and the fixing frame; and
a four-corner-adjusting-mechanism for adjusting a parallelism of the upper and lower sub-frames, wherein the four-corner-adjusting-mechanism further comprises:
an adjusting screw to be vertically inserted in a fixing frame side end portion of at least one of the upper and lower sub-frames, and to be screwed to the fixing frame; and
a flat spring as an upper elastic member and a coiled as lower elastic member that are disposed in series in the vertical direction around a threaded portion of the adjusting screw so as to sandwich the fixing frame side end portion and the flat spring is formed by bending one rectangular metalplate so that an upper plate portion and a lower plate portion form an acute angle with each other, and the upper plate portion functions as a cantilever spring, an end portion of the lower plate portion is bent downward, the flat spring is interposed in a compressed state so that the bent portion to serve as a fulcrum is positioned at the sensor inner side and an open portion to serve as a point of effort is positioned at the sensor outer side, the lower plate portion is disposed along the fixing frame side end portion, and an end portion of the lower plate portion is screw-fixed to a side surface of the fixing frame side end portion.

2. A mass sensor according to claim 1, wherein an elastic modulus of the upper elastic member is smaller than that of the lower elastic member.

3. A mass sensor according to claim 1, wherein the sub-frame that is equipped with the four-corner-adjusting-mechanism further comprises a joint portion joined to the fixing frame, and the joint portion is disposed between the thin portion of the sub-frame and the four-corner-adjusting-mechanism.

* * * * *